(12) United States Patent
Guan (10) Patent No.: US 10,836,255 B2
(45) Date of Patent: Nov. 17, 2020

(54) ON-BOARD MONITORING AND EVENT DETECTION SYSTEM FOR A MACHINE WITH ROTATING COMPONENTS

(71) Applicant: Caterpillar Inc., Peoria, IL (US)

(72) Inventor: Yuanhong Guan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 399 days.

(21) Appl. No.: 15/843,242

(22) Filed: Dec. 15, 2017

(65) Prior Publication Data

US 2019/0184824 A1 Jun. 20, 2019

(51) Int. Cl.
*B60K 28/10* (2006.01)
*G07C 5/00* (2006.01)
*G07C 5/08* (2006.01)

(52) U.S. Cl.
CPC .............. *B60K 28/10* (2013.01); *G07C 5/008* (2013.01); *G07C 5/0816* (2013.01); *G07C 5/0841* (2013.01); *B60Y 2400/3044* (2013.01); *G07C 5/0808* (2013.01)

(58) Field of Classification Search
CPC .... B60K 28/10; G07C 5/0841; G07C 5/0816; G07C 5/008; G07C 5/0808; B60Y 2400/3044
See application file for complete search history.

(56) References Cited

U.S. PATENT DOCUMENTS

| | | |
|---|---|---|
| 5,005,142 A | 4/1991 | Lipchak et al. |
| 5,383,133 A | 1/1995 | Staple |
| 6,292,108 B1 | 9/2001 | Straser et al. |
| 6,567,709 B1 | 5/2003 | Malm et al. |
| 7,168,324 B2 | 1/2007 | Boda et al. |
| 7,171,292 B2* | 1/2007 | Bellinger ............ F02D 41/1498 701/111 |
| 7,194,383 B2 | 3/2007 | Clarke et al. |
| 7,231,303 B2 | 6/2007 | Griessler et al. |
| 8,560,272 B2* | 10/2013 | Gerez .................. F01D 21/003 702/184 |
| 9,605,996 B2 | 3/2017 | Kessler et al. |
| 2007/0250245 A1* | 10/2007 | van der Merwe .... F01D 21/003 701/100 |
| 2013/0211737 A1 | 8/2013 | Batcheller et al. |
| 2017/0067860 A1 | 3/2017 | Grabill et al. |
| 2018/0355928 A1* | 12/2018 | Smith ....................... F16D 9/00 |

* cited by examiner

*Primary Examiner* — Michael J Zanelli
(74) *Attorney, Agent, or Firm* — Miller, Matthias & Hull, Ltd (57) ABSTRACT

An on-board monitoring and event detection system for a machine includes a powertrain. A vibration sensor adjacent one of a rotating component of the powertrain is configured to generate raw vibration data. A sensor controller is configured to receive the raw vibration data and generate condition indicators. At least one of a speed sensor, a torque sensor, a pressure sensor, or a temperature sensor, is operatively associated with the powertrain. A controller is distinct from the sensor controller and is configured to receive the condition indicators, and receive sensor signals from the at least one sensor and wherein the condition indicators and the sensor signals define operating characteristics of the powertrain. The controller is further configured to compare the operating characteristics of the powertrain to an event threshold and generate an event response if the operating characteristics exceed the event threshold for a time period exceeding a time threshold.

17 Claims, 5 Drawing Sheets

ON-BOARD MONITORING AND EVENT DETECTION SYSTEM FOR A MACHINE WITH ROTATING COMPONENTS

TECHNICAL FIELD

This disclosure relates generally to machines with rotating components and, more particularly, to a system and method for monitoring and identifying faults and other events based upon vibrations of the rotating components together with signals from other sensors.

BACKGROUND

Rotating machinery is used in many applications. For example, machines such as mobile machines, e.g., on and off road vehicles, construction machines, earth working machines, and the like, employ principles of rotation to function. Powertrains including engines, motors, drive trains, ground engaging components such as wheels or tracks, and the like rotate to enable the machines to perform work tasks.

The efficiency and life expectancy of rotating machinery may be analyzed through an analysis of vibrations present in the machine components. In particular, the analysis of raw or high frequency vibrations may be particularly useful in determining faults and other events that are occurring or that may occur in the future. In some instances, the vibration analysis may permit an estimation of the future life of components.

U.S. Patent Publication No. 2013/0211737 discloses a heath and usage monitoring system that includes at least one intelligent sensor, a central control module, and a communications network. The intelligent sensor comprises a signal processor, software, a vibration sensor, and a transceiver. The vibration sensor is mounted near a moving component and monitors operation of the moving component.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, an on-board monitoring and event detection system for a machine having a plurality of rotating components includes a powertrain, a vibration sensor, at least one sensor and a controller. The powertrain includes the plurality of rotating components. The vibration sensor includes a vibration sensor element and a sensor controller. The vibration sensor is disposed adjacent one of the plurality of rotating components and is configured to generate raw vibration data indicative of vibrations of the vibration sensor element. The sensor controller is configured to receive the raw vibration data from the vibration sensor element and generate condition indicators based upon the raw vibration data. The at least one sensor may be a speed sensor, a torque sensor, a pressure sensor, or a temperature sensor, operatively associated with the powertrain. The controller is distinct from the sensor controller and is configured to access an event threshold, access a time threshold, receive the condition indicators from the vibration sensor, and receive sensor signals from the at least one of a speed sensor, a torque sensor, a pressure sensor, and a temperature sensor, and wherein the condition indicators and the sensor signals define operating characteristics of the powertrain. The controller is further configured to compare the operating characteristics of the powertrain to the event threshold and generate an event response if the operating characteristics exceed the event threshold for a time period exceeding the time threshold.

In another aspect, method of monitoring and event detection on-board a machine having a powertrain with a plurality of rotating components includes accessing an event threshold, accessing a time threshold, receiving, at a sensor controller of a vibration sensor, raw vibration data from a vibration sensor element of a vibration sensor, with the vibration sensor element being disposed adjacent one of the plurality of rotating components, and utilizing the sensor controller of the vibration sensor to generate condition indicators based upon the vibration data. The method further includes receiving the condition indicators at a controller on-board the machine and distinct from the vibration sensor, receiving, at the controller on-board the machine, sensor signals from at least one of a speed sensor, a torque sensor, a pressure sensor, and a temperature sensor, wherein the condition indicators and the sensor signals define operating characteristics of the powertrain, comparing, at the controller on-board the machine, the operating characteristics of the powertrain to the event threshold, and generating, at the controller on-board the machine, an event response if the operating characteristics exceed the event threshold for a time period exceeding the time threshold.

In still another aspect, a machine includes a powertrain having a prime mover, a transmission operatively connected to the prime mover, and ground engaging drive mechanisms operatively connected to the transmission, with the powertrain further including a plurality of rotating components. A vibration sensor includes a vibration sensor element and a sensor controller. The vibration sensor is disposed adjacent one of the plurality of rotating components and is configured to generate raw vibration data indicative of vibrations of the vibration sensor element. The sensor controller is configured to receive the raw vibration data from the vibration sensor element and generate condition indicators based upon the raw vibration data. At least one of a speed sensor, a torque sensor, a pressure sensor, or a temperature sensor, is operatively associated with the powertrain. A controller is distinct from the sensor controller and is configured to access an event threshold, access a time threshold, receive the condition indicators from the vibration sensor, and receive sensor signals from the at least one of a speed sensor, a torque sensor, a pressure sensor, and a temperature sensor, and wherein the condition indicators and the sensor signals define operating characteristics of the powertrain. The controller is further configured to compare the operating characteristics of the powertrain to the event threshold and generate an event response if the operating characteristics exceed the event threshold for a time period exceeding the time threshold.

DETAILED DESCRIPTION

Figure 1:
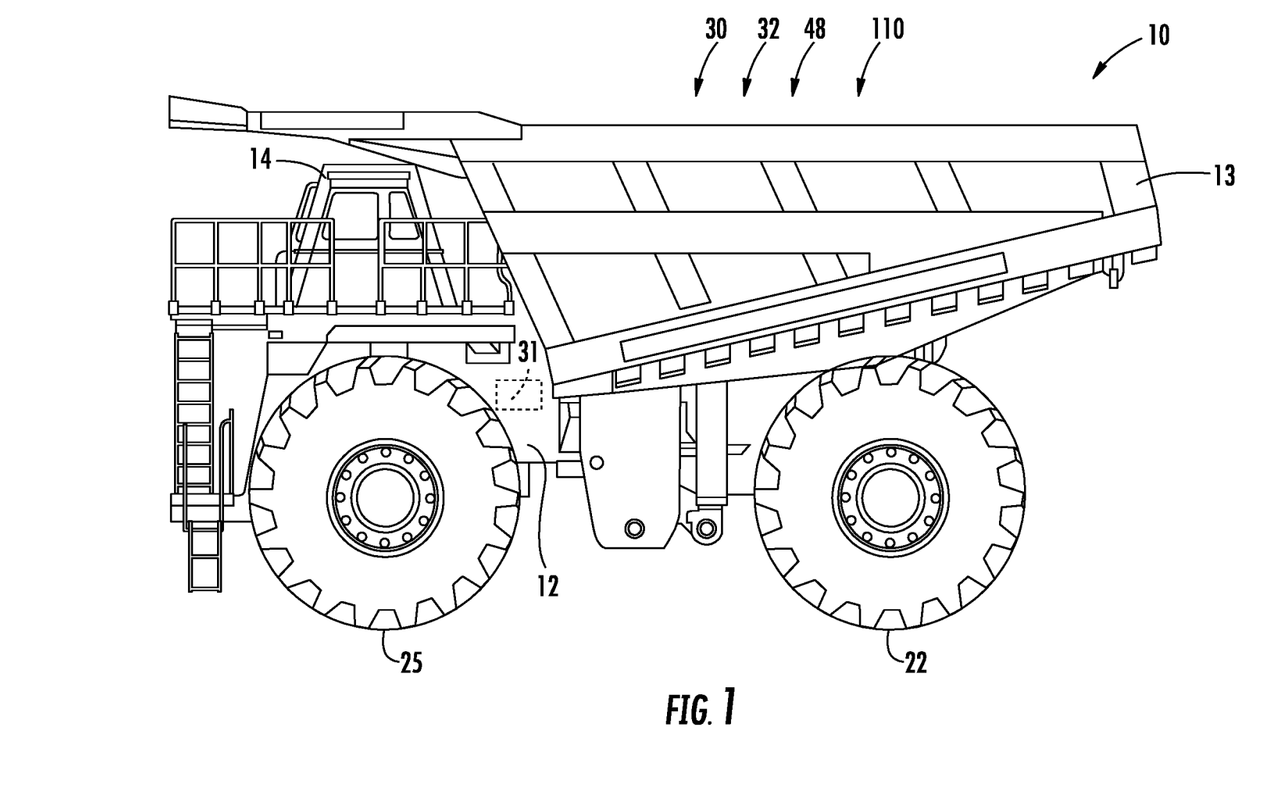
FIG. 1 depicts a diagrammatic illustration of the haul truck for use with an on-board monitoring and event detection system in accordance with the disclosure.

FIG. 1 depicts a diagrammatic illustration of an exemplary machine configured as a haul truck 10 for hauling or transporting material. The haul truck depiction is merely for illustrative purposes in that the systems depicted herein may be used with any type of machine having rotating components.

The haul truck 10 includes a frame 12 and a payload container 13 that may be pivotably mounted on frame. Haul truck 10 may include a cab 14 for an operator to physically occupy and provide input to control the machine.

Figure 2:
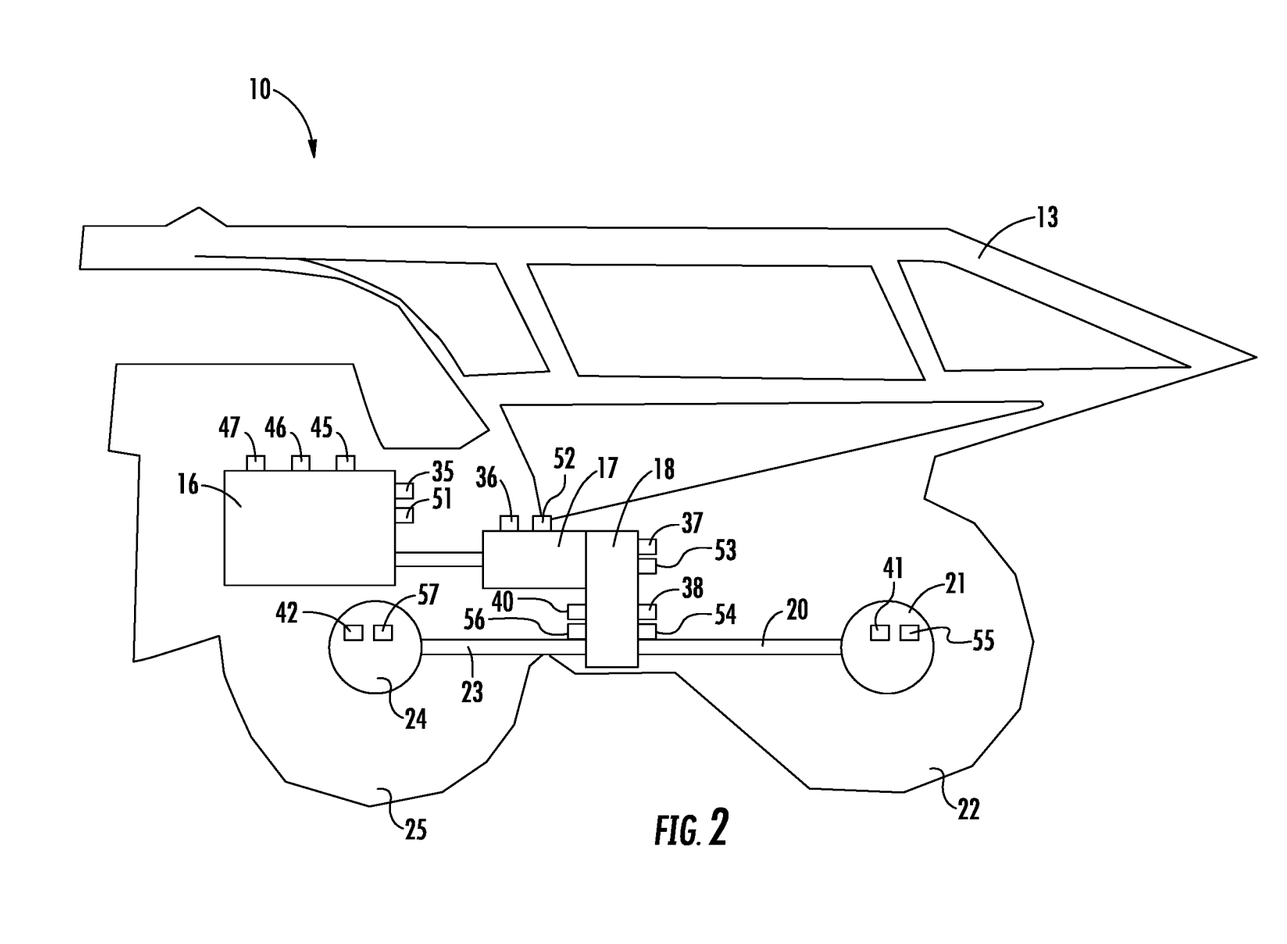
FIG. 2 depicts a block diagram of a powertrain and sensors of the haul truck of FIG. 1.

Referring to FIG. 2, haul truck 10 may include a powertrain 15 that includes a prime mover such as an engine 16 that is operatively connected to and may drive a transmission 17. Transmission 17 may be operatively connected to and drive a drop box or gearbox 18. In some instances, the transmission 17 and the gearbox 18 may be a single unit. A rear drive shaft 20 operatively connects the gearbox 18 to a rear final drive 21 that is operatively connected to and may drive the ground engaging drive mechanisms configured as rear wheels 22. A front drive shaft 23 operatively connects the gearbox 18 to a front final drive 24 that is operatively connected to and may drive the ground engaging drive mechanisms configured as front wheels 25.

The haul truck 10 may use any type of propulsion and drivetrain mechanisms including hydrostatic, electric, or a mechanical drive. Regardless of the type or configuration, the powertrain 15 includes a plurality of rotating components or elements. For example, the prime mover, when configured as an engine 16, may include a crankshaft (not shown), cam shafts (not shown), sprockets (not shown) and other rotating components or elements. The transmission 17, gearbox 18, rear final drive 21, and front final drive 24 may also each include rotating shafts (not shown) and/or rotating gears (not shown).

Haul truck 10 may be controlled by a control system 30 as shown generally by an arrow in FIG. 1 indicating association with the machine. The control system 30 may include an electronic control module or controller 31 and a plurality of sensors. The controller 31 may control the operation of various aspects of the haul truck 10 including the powertrain 15 and other systems.

The controller 31 may be an electronic controller that operates in a logical fashion to perform operations, execute control algorithms, store, retrieve, and access data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 31 such as power supply circuitry, signal conditioning circuitry, driver circuitry, and other types of circuitry.

The controller 31 may be a single controller or may include more than one controller disposed to control various functions and/or features of the haul truck 10. The term "controller" is meant to be used in its broadest sense to include one or more controllers and/or microprocessors that may be associated with the haul truck 10 and that may cooperate in controlling various functions and operations of the machine. The functionality of the controller 31 may be implemented in hardware and/or software without regard to the functionality. The controller 31 may rely on one or more data maps relating to the operating conditions and the operating environment of the haul truck 10 and a work site that may be stored in the memory of or associated with the controller. Each of these data maps may include a collection of data in the form of tables, graphs, and/or equations. As depicted, the controller 31 is on-board the haul truck 10.

The control system 30 may include an on-board monitoring and event detection system as shown generally at 32 for diagnostic purposes and, in some instances, for predicting the remaining useful life machine components and systems. To do so, the on-board monitoring and event detection system 32 may receive data from various sensors on and/or off the haul truck 10 and compare the data to the data maps of the controller 31 to identify failures or event conditions. In one embodiment, the on-board monitoring and event detection system 32 may be used to identify failures, fault conditions, and other events associated with the powertrain 15.

The haul truck 10 may be equipped with a plurality of sensors that provide data indicative (directly or indirectly) of various operating parameters of elements of the powertrain 15 and/or the operating environment in which the powertrain is operating. The term "sensor" is meant to be used in its broadest sense to include one or more sensors and related components that may be associated with the powertrain 15 and that may cooperate to sense various functions, operations, and operating characteristics of the elements of the powertrain and/or aspects of the environment in which the powertrain is operating.

Figure 4:
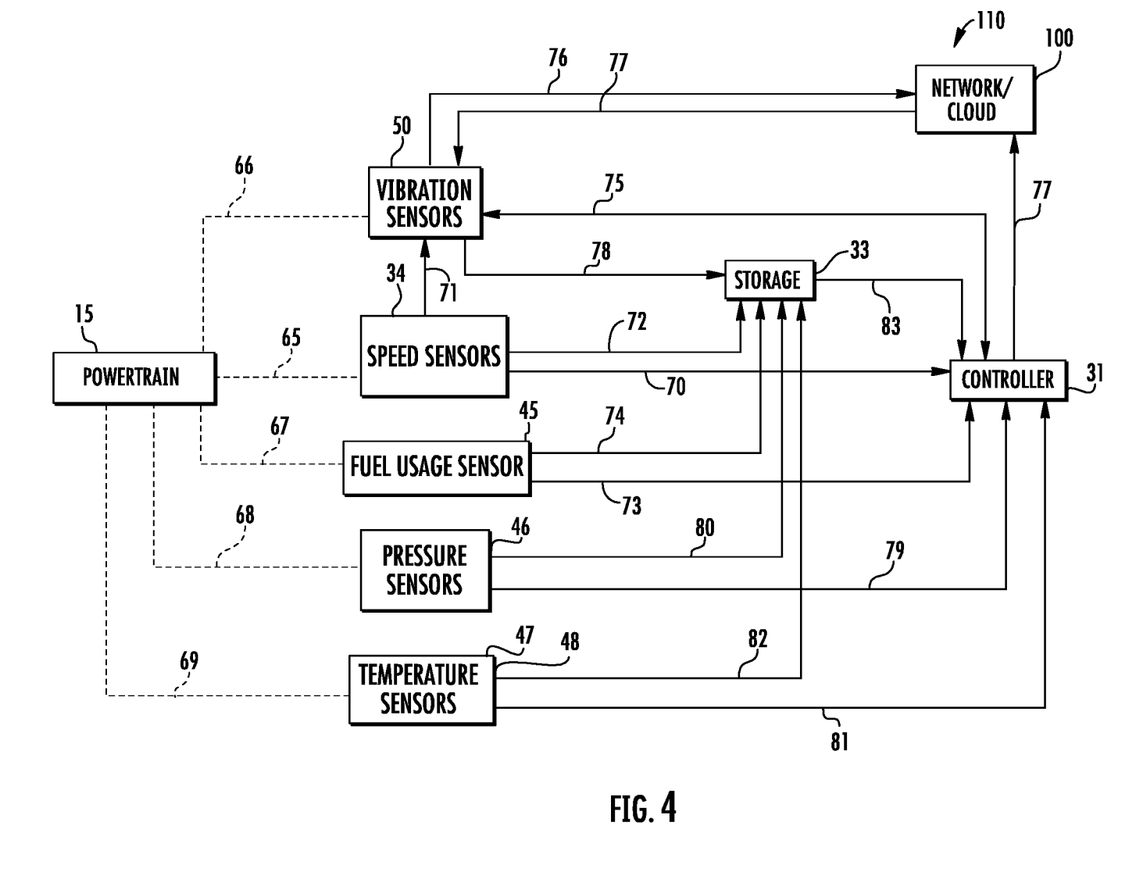
FIG. 4 depicts a block diagram of the on-board monitoring and event detection system for use with the haul truck of FIG. 1.

A plurality of speed sensors may be operatively associated with components of the powertrain 15. In FIG. 4, the speed sensors are generically identified at 34. Referring back to FIG. 2, an engine speed sensor generally indicated at 35 may be provided on or associated with the engine 16 to monitor the output speed of the engine. The engine speed sensor 35 may generate engine speed data indicative of the output speed of engine 16.

A transmission speed sensor generally indicated at 36 may be provided on or associated with the transmission 17 to monitor the output speed of the transmission. The transmission speed sensor 36 may generate transmission speed data indicative of the output speed of transmission 17.

In some instances, in addition or in the alternative to any other sensors, a gearbox speed sensor generally indicated at 37 may be provided on or associated with the gearbox 18 to monitor the output speed of the gearbox. The gearbox speed sensor 37 may generate gearbox speed data indicative of the output speed of gearbox 18.

In some instances, in addition or in the alternative to any other sensors, a rear drive shaft speed sensor generally indicated at 38 may be provided on or associated with the rear drive shaft 20 to monitor the speed of the rear drive shaft and a front drive shaft speed sensor generally indicated at 40 may be provided on or associated with the front drive shaft 23 to monitor the speed of the front drive shaft. The drive shaft speed sensors 38, 40 may generate drive shaft speed data indicative of the speed of respective drive shafts 20, 23.

In some instances, in addition or in the alternative to any other sensors, a rear final drive speed sensor generally indicated at 41 may be provided on or associated with the rear final drive 21 to monitor the speed of the rear final drive and a front final drive speed sensor generally indicated at 42 may be provided on or associated with the front final drive 24 to monitor the speed of the front final drive. The final drive speed sensors 41, 42 may generate final drive speed data indicative of the speed of respective final drives 21, 24.

Other sensors may be associated with each of the engine 16, transmission 17, gearbox 18, rear drive shaft 20, rear final drive 21, and front drive shaft 23, and front final drive 24. In one example, a fuel usage sensor 45 may be provided to sense the amount of fuel being used by the engine 16. In another example, the engine 16 may include one or more pressure sensors 46 to sense the pressure of different systems associated with the engine (e.g., intake air pressure, exhaust gas pressure). In still another example, the engine 16 may include one or more temperature sensors to sense the temperature of different systems associated with the engine (e.g., intake air temperature, exhaust gas temperature). Other components of the powertrain 15 may also include temperature sensors, if desired. Still further, an ambient air temperature sensor indicated generally at 48 (FIG. 1) may also be provided if desired.

The combination of the fuel usage sensor 45 and the engine speed sensor 35 may act as an equivalent of a torque sensor for generating torque signals indicative of an output torque from the engine 16. Other manners of determining the output torque from the prime mover are contemplated. For example, other sensors may be used when using a non-combustion power source.

Each of the foregoing sensors may operate at a relatively low speed or sampling rate. In some embodiments, the sampling rate may be between 1 and 100 Hz (i.e., between 10 and 1000 ms).

The rotating components of the powertrain 15 may be subjected to and exhibit vibrations during the operation of the haul truck 10. Monitoring and analysis of the vibrations of the rotating components may be used by the on-board monitoring and event detection system 32 for diagnostic purposes and, in some instances, for predicting the remaining useful life of machine components and systems.

Accordingly, each of the components of the powertrain 15 may include one or more vibration sensors 50 (FIG. 4) operatively associated therewith. The vibration sensors 50 may be mounted in any desired manner. In some instances, a vibration sensor 50 may be positioned or disposed on the component being monitored and in other instances may be near or adjacent the component being monitored.

As depicted in FIG. 2, one or more engine vibration sensors 51 may be operatively associated with the engine 16, one or more transmission vibration sensors 52 may be operatively associated with the transmission 17, one or more gearbox vibration sensors 53 may be operatively associated with the gearbox 18, one or more rear drive shaft vibration sensors 54 may be operatively associated with the rear drive shaft 20, one or more rear final drive vibration sensor 55 may be operatively associated with the rear final drive 21, one or more front drive shaft vibration sensors 56 may be operatively associated with the front drive shaft 23, and one or more front final drive vibration sensors 57 may be operatively associated with the front final drive 24.

Each of the vibration sensors 50 may be provided on or associated with the components of the powertrain 15 to permit the sensors to monitor vibrations of the respective components of the powertrain. Although described with each component of the powertrain 15 having one or more vibration sensors 50, the systems described herein may not require that each of components include at least one vibration sensor.

Figure 3:
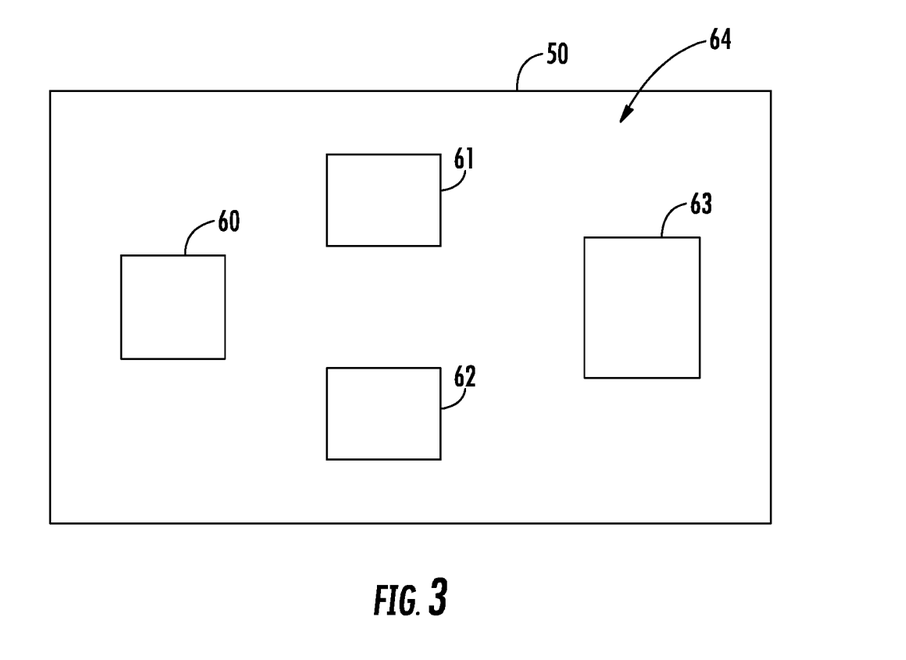
FIG. 3 depicts a block diagram of a smart sensor for use with the on-board monitoring and event detection system.

Referring to FIG. 3, each of the vibration sensors 50 may comprise a vibration sensor element 60 configured as an accelerometer that generates acceleration data or signals indicative of the acceleration of one or more components of the powertrain 15. In one example, the vibration sensor element 60 may comprise a Piezoelectric accelerometer. The use of other types of vibration sensor elements and other types of accelerometers are contemplated. In some embodiments, the accelerometer may be a multi-axis accelerometer. In other embodiments, the accelerometer may be a single axis accelerometer.

In an embodiment, each vibration sensor 50 may be configured as a "smart sensor" including the vibration sensor element 60 for sensing and generating vibration data, a processor 61 (analog and/or digital) for controlling the operation of the vibration sensor, memory 62 for storing data (either raw or manipulated), and other components or circuitry 63 as desired to permit the vibration sensor to process, store, analyze, transform, and otherwise manipulate or control data as desired. As used herein, the sensor controller, generally depicted at 64, refers to the processor 61 as well as the memory 62 and the other components or circuitry 63 to the extent necessary to carry out the desired functionality of the sensor controller. The processor 61 and the sensor controller 64 are each distinct from the controller 31. In some instances, each vibration sensor 50 may be a single component such as with each element mounted or formed on a single circuit board, a circuit member, or within a housing.

In order to provide acceleration data that is useful to the on-board monitoring and event detection system 32, the vibration sensors 50 may be configured to be used with a relatively high frequency sampling rate. More specifically, if the sampling rate is too low, the vibration data may not provide enough differentiation between the acceleration data to permit the on-board monitoring and event detection system 32 to operate as desired. In one example, the sampling rate may be at least 20 kHz. In another example, the sampling rate may be at least 10 kHz. In still another example, the sampling rate may be at least 5 kHz. As used herein, a sampling rate of at least 5 kHz means a sampling rate with a frequency of 5 kHz or more such as 5 kHz, 10 kHz, 20 kHz or other frequencies greater than 5 kHz. Other sampling rates are contemplated. As used herein, a sampling rate above 1 kHz may be considered high frequency.

The controller 31 may be configured to operate with sampling rates of between 0.1-100 Hz (i.e., 10 ms to 10 seconds). Accordingly, the controller 31 may receive and process data from the speed sensors 34, the fuel usage sensor 45, the pressure sensors 46, and the temperature sensors 47, 48 without any loss in signal quality because those sensors have operating ranges within the sampling rate of the controller. However, since it is desirable for the vibration data from the vibration sensors 50 to have a higher sampling rate in order to capture the desired information, in many instances, the controller 31 may not be able to process the vibration data or the distinctions in the movement of the sensors may not be identified by the controller. Accordingly, the sensor controller 64 of the vibration sensor 50 may be configured to operate at a sufficiently high sampling rate or processing speed to permit the analysis and/or manipulation of the raw vibration data. As used herein, "raw vibration data" refers to vibration data sampled or gathered at a high frequency (i.e., above 1 kHz).

More specifically, the vibration sensors 50 may be configured to process or analyze the raw vibration data from the vibration sensor element 60 into lumped sum values that summarize the raw vibration data in some manner to extract some feature or features from the raw vibration data to permit subsequent analysis. Those features may be referred to as condition indicators. Examples of such condition indicators include overall energy (i.e., root mean square ("RMS") average of the raw acceleration or vibration data), peak to peak values, kurtosis, crest factor (or other statistics base values), energy over a specified frequency (e.g., 1 kHz), energy over a specified frequency and some sidebands (e.g., 1 kHz plus bands of 100 Hz on each side of 1 kHz), energy over a specified frequency and some harmonics (e.g., 1 kHz plus a first harmonic of 2 kHz), enveloping energy at certain frequency bands, or any other processed parameters based on different purposes.

In some instances, the vibration sensor 50 may be configured to receive data from other sensors or systems and process the raw vibration data to generate the condition indicators based upon the data from the other sensors or systems. For example, a specified or predetermined frequency about which the analysis may be performed may be selected based upon the rotational speed of components within the powertrain 15 as well as the torque generated by the engine 16. In another example, the type of analysis used to generate the condition indicators may be based upon the rotational speed of components within the powertrain 15 as well as the torque generated by the engine 16.

The sensor controller 64 of each vibration sensor 50 may be configured to receive raw vibration data and process the data into a form that may be more readily usable by the controller 31. To do so, the sensor controller 64 may repeatedly summarize a specified time period or length of time (e.g., 1 second) of the raw vibration data to generate a plurality of lumped sum values or condition indicators at a slower rate or frequency than the frequency of the raw vibration data. These condition indicators are thus generated at a slower update rate that is within the acceptable sampling rate or processing speed of the controller 31 as compared to the sampling rate of the vibration sensor element 60, which is above the sampling rate of the controller. Thus, the vibration sensor 50 is able to transform the raw vibration data into a form that is usable by the controller 31. The condition indicators may be provided as output in digital form from the vibration sensor 50. As used herein, updating the condition indicators at a rate below 1 kHz may be considered low frequency.

If desired, the rate at which the condition indicators are updated or provided to the controller 31 from vibration sensors 50 may not be uniform. In an example, the update rate at which the condition indicators are generated and provided to controller 31 may be vary and may be dependent upon the rotational speed of components within the powertrain 15 and/or the torque generated by the engine 16.

FIG. 4 depicts a block diagram of the on-board monitoring and event detection system 32 for use with a machine such as haul truck 10. In FIG. 4, the speed sensors are identified at 34 and may correspond to any of the engine speed sensor 35, the transmission speed sensor 36, the gearbox speed sensor 37, the drive shaft speed sensors 38, 40, and/or the final drive speed sensors 41, 42. One or more of the components of the powertrain 15 may be operatively associated (as depicted by dashed line 65) with one or more speed sensors 34.

In FIG. 4, the vibration sensors are identified at 50 and may correspond to any of the engine vibration sensor 51, the transmission vibration sensor 52, the gearbox vibration sensor 53, the drive shaft vibration sensors 54, 56, and/or the final drive vibration sensors 55, 57. One or more of the components of the powertrain 15 may be operatively associated (as depicted by dashed line 66) with one or more vibration sensors. Any number of vibration sensors may be associated with the powertrain 15 and the on-board monitoring and event detection system 32.

Fuel usage sensor 45 may be operatively associated with the engine 16 as depicted by dashed line 67. Pressure sensors 46 may be operatively associated with the engine 16 as depicted by dashed line 68. Temperature sensors 47, 48 may be operatively associated with the engine 16 as depicted by dashed line 69.

Speed signals from the speed sensors 34 may be transmitted along first communications link 70 and received by controller 31. Speed signals from the speed sensors 34 may also be transmitted along second communications links 71 between the speed sensors and the vibration sensors 50. The second communications links 71 may transmit or interconnect any combination of the speed sensors 34 and vibration sensors 50. Speed signals from the speed sensors 34 may further be transmitted along third communications link 72 to a storage system 33.

Fuel signals from the fuel usage sensor 45 may be transmitted to the controller 31 along fourth communications link 73 and to the storage system 33 along fifth communications link 74. Torque signals indicative of the torque generated by the engine 16 may be transmitted to the vibration sensors 50 along sixth communications link 75.

Condition indicators from each vibration sensor element 60 may be compared to one or more vibrations thresholds by the sensor controller 64 and if a threshold is exceeded, raw vibration data may be sent by the processor along seventh communications link 76 to a remote system 100 such as a remote network or system accessible through the "cloud" that is at a location remote from haul truck 10. If desired, the remote system 100 may request additional raw vibration data from the vibration sensor 50 along eighth communications link 77.

The condition indicators generated by each vibration sensor 50 may be sent by the sensor controller 64 along ninth communications link 78 to the storage system 33. Data or signals may also be sent bi-directionally between the controller 31 and the vibration sensors 50 along sixth communications link 75. As an example, condition indicators may be sent by the vibrations sensors 50 to the controller 31. As another example, controller 31 may send instructions to the vibration sensors 50, such as instructing the vibration sensor to send raw vibration data to remote system 100.

Pressure signals from the pressure sensors 46 may be transmitted to the controller 31 along tenth communications link 79 and to the storage system 33 along eleventh communications link 80.

Temperature signals from the temperature sensor 47, 48 may be transmitted to the controller 31 along twelfth communications link 81 and to the storage system 33 along thirteenth communications link 82.

Storage system 33 may be configured to send data to controller 31 along fourteenth communications link 83. Storage system 33 may be configured in any manner. In an embodiment, storage system 33 may be configured as CAN-compatible storage component or system and thus may connect to controller 31 along a CAN bus of haul truck 10. In an embodiment, storage system 33 may have sufficient capacity to store data for months or years to permit subsequent analysis of the historical data associated with powertrain 15.

A fifteenth communications link 84 may be provided between the controller 31 and the remote system 100 to provide data from the other sensors to the remote system. This data may be used together with the raw vibration data at the remote system 100 for diagnostic or other purposes.

Each of the communications links 70-83 may be wired or wireless and may form a portion of a communications bus of the haul truck 10. Each of the communications links 70-83 may be mono-directional or be bi-directional, as desired.

The haul truck 10 and remote system 100 may each include a transceiver generally indicated at 110 to facilitate communications between the haul truck and the remote system. The transceiver 110 on-board haul truck 10 may communicate with the vibration sensor 50 directly or through controller 31 to facilitate communications to and from the haul truck to the remote system 100.

INDUSTRIAL APPLICABILITY

The industrial applicability of the system described herein will be readily appreciated from the forgoing discussion. The on-board monitoring and event detection system 32 may be used with machines that include rotating components that are subject to vibrations. The on-board monitoring and event detection system 32 may determine whether the powertrain 15, and in some instances other components of the haul truck 10, are experiencing a reportable condition based upon operating characteristics based upon data from any or all of the sensors on the machine providing information to the controller 31. More specifically, the on-board monitoring and event detection system 32 may compare the operating characteristics of the powertrain (and other components of the machine, if desired) to one or more event thresholds and potentially generate an event response if the event threshold is exceeded. The operating characteristics of the powertrain 15 may be defined by the condition indicators plus any or all of the speed of one or more components of the powertrain, the torque generated by the engine 16, the pressure at one or more pressure sensor 46, and the temperature at one or more temperature sensor 47, 48.

Figure 5:
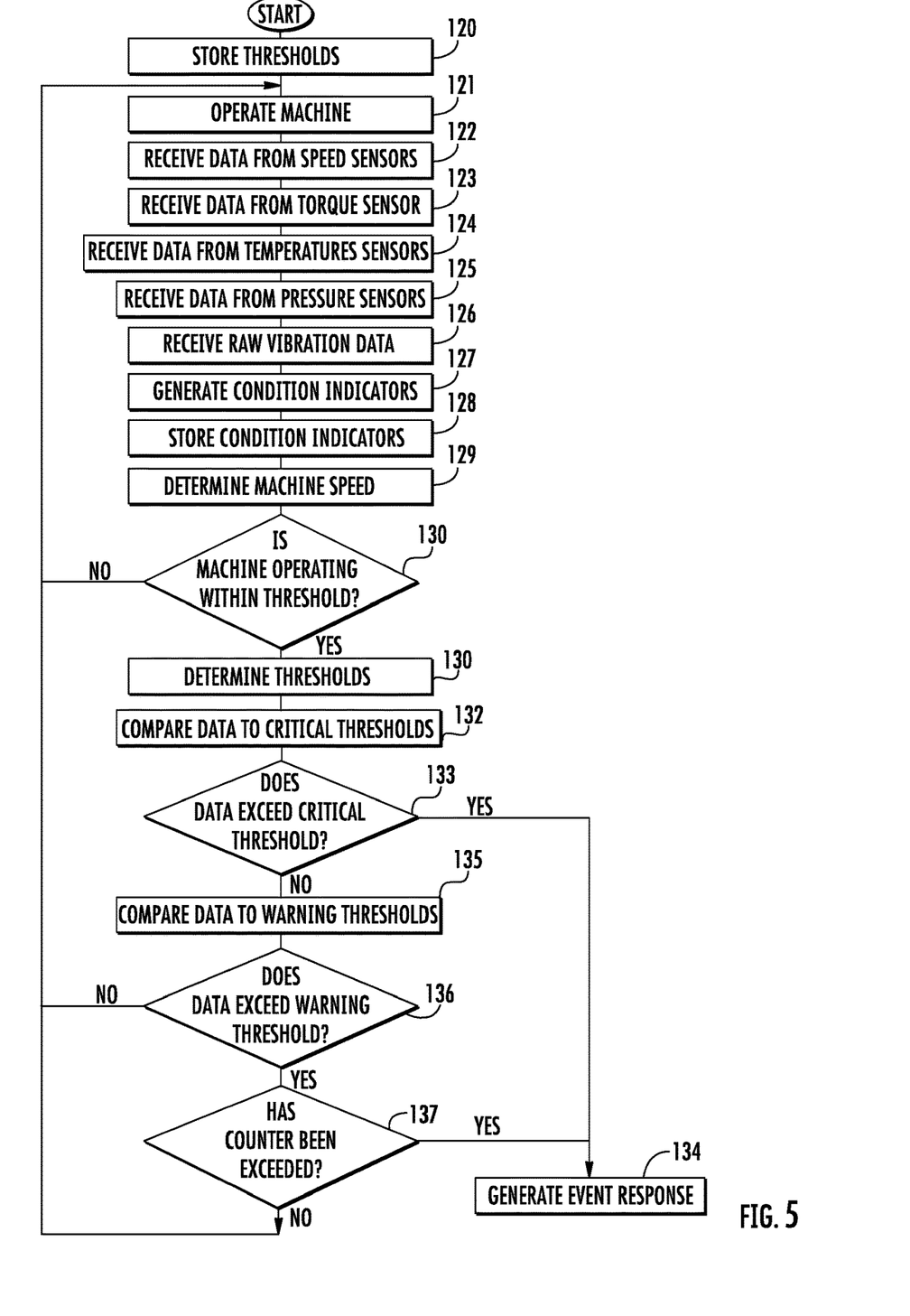
FIG. 5 depicts a flowchart illustrating a process for operating the on-board monitoring and event detection system.

FIG. 5 depicts one example of the operation of the on-board monitoring and event detection system 32. At stage 120, a plurality of thresholds may be stored. The thresholds may include one or more machine speed thresholds, one or more event thresholds such as critical thresholds and/or warning thresholds, one or more time thresholds, and a counter threshold.

In an embodiment, the machine speed threshold may correspond to a maximum change in speed of the haul truck 10 over a specified period of time. The machine speed threshold may be used to determine when the change in speed of the haul truck 10 is sufficiently low so as to permit the use of the on-board monitoring and event detection system 32. In an example, the haul truck 10 may be considered to be operating at a steady state condition if the speed of the machine does not vary by more than two percent over a ten second period. In an example, haul truck 10 may be considered to be operating at a slow speed change condition if the speed of the machine does not vary by more than 30 percent over a ten second period.

In some embodiments, different critical thresholds may be used depending on whether the machine is operating at a steady-state condition or whether the machine is operating at a slow speed change condition. In some embodiments, different warning thresholds may be used depending on whether the machine is operating at a steady-state condition or whether the machine is operating at a slow speed change condition. Whether the machine is operating at a steady state condition or a slow speed change condition may be determined from data from any speed sensor 34.

A critical threshold may be used to determine when the powertrain 15 (or another component) of the haul truck 10 is operating in a manner so that a significant or critical issue may be occurring. The on-board system 32 may be configured to operate with a plurality of critical thresholds. In embodiments, different critical thresholds may include different critical time thresholds that depend on the severity of a potential event. In an example, a first critical threshold may correspond to a first set of characteristics that exceeds the threshold for a first critical time threshold or length of time. A second critical threshold may correspond to a second set of characteristics that are less severe than the first critical threshold but occur for a second critical time threshold that is greater or longer than the first critical time threshold.

Further, in embodiments, different critical thresholds may be provided that are based upon data from any of the various sensors on the haul truck. In other words, the critical threshold or thresholds being used at a particular time may be dependent upon the speed of one or more components of the drivetrain 15, the torque generated by the engine 16, the pressure at one or more pressure sensor 46, as well as the temperature at one or more temperature sensor 47, 48.

A warning threshold may be used to determine when the powertrain 15 (or another component) of the haul truck 10 is operating in a manner so that an issue may be occurring but it does not rise to the level of a critical issue. In order to minimize or reduce the possibility of false positive warnings, the on-board monitoring and event detection system 32 may require that the warning threshold be exceeded more than once during a specified time period before confirming that an issue is occurring.

As with the critical thresholds, each vibration sensor 50 may be configured to operate with a plurality of warning thresholds. In embodiments, different warning thresholds may include different warning time thresholds that depend on the severity of a potential event. In an example, a first warning threshold may correspond to a first set of characteristics that exceeds the threshold for a first warning time threshold. A second warning threshold may correspond to a second set of characteristics that are less severe than the first warning threshold but occur for a second warning time threshold that is greater or longer than the first warning time threshold.

As also with the critical thresholds, different warning thresholds may also be provided that are based upon data from any of the various sensors on the haul truck. As with the critical thresholds, the warning thresholds being used at a particular time may be dependent upon the speed of one or more components of the powertrain 15, the torque generated by the engine 16, the pressure at one or more pressure sensor 46, as well as the temperature at one or more temperature sensor 47, 48.

The haul truck 10 may be operated at stage 121. Data from the speed sensors 34 may be received at stage 122. More specifically, data from the speed sensors 34 may be received at the controller 31, the storage system 33, and at each of the vibration sensors 50. In some instances, only data from certain speed sensors 34 will be received at certain of the vibration sensors 50. In other words, the speed data from each speed sensor 34 may not need to be received at each vibration sensor 50.

Torque signals indicative of the torque generated by the engine 16 may be received at stage 123. In one embodiment, fuel usage signals may be received by the controller 31 from the fuel usage sensor 45. The torque signals may be generated by the controller 31 based upon the engine speed signals and fuel usage signal and transmitted to the vibration sensors 50. In another embodiment, torque data or signals may be sent directly to the vibration sensors 50 from a torque sensor.

At stage 124, data from the pressure sensors 46 may be received at the controller 31 and the storage system 33. At stage 125, data from the temperature sensors 47, 48 may be received at the controller 31 and the storage system 33.

Raw vibration data from each vibration sensor element 60 may be received by its sensor controller 64 at stage 126. At stage 127, the sensor controller 64 may analyze the high-speed vibration data and generate a summary in the form of lumped sum values or condition indicators. As an example, raw vibration data may be sampled at 20 kHz. The sensor controller 64 may summarize one second of data to generate a single data point or condition indicator. The vibration sensor 50 may continue this process to generate condition indicators at a rate of 1 Hz. Other rates of summarizing the raw data are contemplated. The rate at which the raw vibration data may be sampled or summarized may be dependent upon data the rotational speed of the component adjacent the relevant vibration sensor.

The condition indicators may be transmitted to and stored at the controller 31 and/or the storage system 33 at stage 128. At stage 129, the controller 31 may determine the speed of the haul truck 10. To do so, the controller 31 may analyze speed data from any of the speed sensors 34. If the haul truck 10 is not operating within a desired threshold (e.g., steady state or slow speed change) at decision stage 130, the machine may continue to be operated and stages 121-130 repeated.

If the haul truck 10 is operating within a desired threshold (e.g., steady state or slow speed change) at decision stage 130, the controller 31 may determine the applicable thresholds (e.g., critical thresholds and warning thresholds). The applicable thresholds may be selected or determined based upon any of: 1) whether the haul truck 10 is operating at steady state; 2) whether the haul truck is operating at a slow speed change condition; and 3) the data from any of the various sensors on the haul truck.

At stage 132, the controller 31 may compare the data from one or more sensors on the haul truck 10 to the applicable critical thresholds.

If the data from the sensors exceeds one or more critical thresholds at decision stage 133 for a specified period of time, the controller 31 may generate an event response and take any desired action at stage 134. Such event response may include any or all of sending an alarm to an operator at the haul truck 10, sending an alarm to personnel remote from the haul truck, requesting addition information such as the performance of an oil quality sampling, or generating instructions to shut down the haul truck. The oil sampling may be performed manually or using sensors and may analyze properties of and debris in the oil and the condition of the filter. The analyzed oil properties may include the conductivity, permittivity, dielectric constant and any other desired property.

If the data from the sensors does not exceed one or more critical thresholds at decision stage 133 for a specified period of time, the controller 31 may compare at stage 135 the data from one or more sensors on the haul truck 10 to the applicable warning thresholds.

If the data from the sensors does not exceed one or more warning thresholds at decision stage 136 for a specified period of time, the haul truck 10 may continue to be operated and stages 120-136 repeated. If the data from the sensors does exceed one or more warning thresholds at decision stage 136 for a specified period of time, the controller 31 may utilize a counter to determine at decision stage 137 whether a counter threshold has been exceeded.

The counter may operate by tracking or counting the number of times that one or more warning thresholds have been exceeded within a specified period of time (e.g., the reset threshold time period). In an example, the counter associated with a warning threshold may be reset after a two hour time period if the warning threshold has not been exceeded a second time. In another example, the counter associated with a warning threshold may be reset after one hour of continuous operation if the warning threshold has not been exceeded a second time.

If the data from the sensors exceeds one or more warning thresholds at decision stage 136 and the counter has not been exceeded at decision stage 137, the haul truck 10 may continue to be operated and stages 120-137 repeated. If the data from the sensors exceeds one or more warning thresholds at decision stage 136 and the counter has been exceeded at decision stage 134 may be repeated. If desired, the haul truck 10 may also continue to be operated and stages 120-137 repeated. In other instances, the operation of the machine may be terminated.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An on-board monitoring and event detection system for a machine having a plurality of rotating components, comprising:

a powertrain, the powertrain including the plurality of rotating components;

a vibration sensor, the vibration sensor including a vibration sensor element and a sensor controller, the vibration sensor being disposed adjacent one of the plurality of rotating components, the vibration sensor element being configured to generate raw vibration data indicative of vibrations of the vibration sensor element, and the sensor controller being configured to receive the raw vibration data from the vibration sensor element, and generate condition indicators based upon the raw vibration data;

at least one of a speed sensor, a torque sensor, a pressure sensor, and a temperature sensor, operatively associated with the powertrain; a a controller, distinct from the sensor controller, configured to:
  access an event threshold;
  access a time threshold;
  receive the condition indicators from the vibration sensor;
  receive sensor signals from the at least one of a steed sensor, a torque sensor, a pressure sensor, and a temperature sensor;
  wherein the condition indicators and the sensor signals define operating characteristics of the powertrain;
  compare the operating characteristics of the powertrain to the event threshold; and
  generate an event response if the operating characteristics exceed the event threshold for a time period exceeding the time threshold; and further comprising a speed sensor and a torque sensor, the speed sensor being configured to generate speed signals indicative of a speed of one of the plurality of rotating components, the torque sensor being configured to generate torque signals indicative of a torque generated by a prime mover operatively associated with the powertrain, and wherein the operating characteristics are defined by the condition indicators, the speed signals, and the torque signals.

2. The system of claim 1, wherein the event response comprises sending an alarm.

3. The system of claim 1, wherein the event response comprises a request for additional information.

4. The system of claim 3, wherein the request for additional information comprises oil quality sampling.

5. The system of claim 1, wherein the event response comprises generating instructions to shut down the machine.

6. The system of claim 1, wherein the operating characteristics are further defined by temperature signals from a temperature sensor.

7. The system of claim 1, wherein the operating characteristics are further defined by pressure signals from a pressure sensor.

8. The system of claim 1, wherein the event threshold is based upon the speed signals and the torque signals.

9. The system of claim 1, wherein the sensor controller is configured to determine the condition indicators about a predetermined frequency.

10. An on-board monitoring and event detection system for a machine having a plurality of rotating components, comprising:
  a powertrain, the powertrain including the plurality of rotating components;
  a vibration sensor, the vibration sensor including a vibration sensor element and a sensor controller, the vibration sensor being disposed adjacent one of the plurality of rotating components, the vibration sensor element being configured to generate raw vibration data indicative of vibrations of the vibration sensor element, and the sensor controller being configured to receive the raw vibration data from the vibration sensor element, and generate condition indicators based upon the raw vibration data;
  at least one of a speed sensor, a torque sensor, a pressure sensor, and a temperature sensor, operatively associated with the powertrain; and
  a controller, distinct from the sensor controller, configured to:
    access an event threshold;
    access a time threshold;
    receive the condition indicators from the vibration sensor;
    receive sensor signals from the at least one of a speed sensor, a torque sensor, a pressure sensor, and a temperature sensor;
    wherein the condition indicators and the sensor signals define operating characteristics of the powertrain;
    compare the operating characteristics of the powertrain to the event threshold; and
  generate an event response if the operating characteristics exceed the event threshold for a time period exceeding the time threshold,
  wherein the event threshold defines a critical threshold, the time threshold defines a critical time threshold, and the controller is further configured to:
    access a warning threshold;
    access a warning time threshold; and
    if the operating characteristics do not exceed the critical threshold for a time exceeding the critical time threshold, compare the operating characteristics to the warning threshold, and if the operating characteristics exceed the warning threshold for a time exceeding the warning time threshold, generate the event response.

11. The system of claim 10, wherein the controller is further configured to:
  access a counter threshold,
  if the operating characteristics exceed the warning threshold for a time exceeding the warning time threshold, add to a counter;
  compare the counter to the counter threshold; and
  only generate the event response if the counter exceeds the counter threshold.

12. The system of claim 11, wherein the sensor controller is configured to access a reset threshold time period and reset the counter if the operating characteristics do not exceed the warning threshold for a time exceeding the warning time threshold within the reset threshold time period.

13. The system of claim 10, wherein a sampling rate of the raw vibration data is at least 10 kHz.

14. A method of monitoring and event detection on-board a machine having a powertrain with a plurality of rotating components, comprising:
  accessing an event threshold;
  accessing a time threshold;
  receiving, at a sensor controller of a vibration sensor, raw vibration data from a vibration sensor element of a vibration sensor, the vibration sensor element being disposed adjacent one of the plurality of rotating components;
  utilizing the sensor controller of the vibration sensor to generate condition indicators based upon the vibration data;
  receiving the condition indicators at a controller on-board the machine and distinct from the vibration sensor;
  receiving, at the controller on-board the machine, sensor signals from at least one of a speed sensor, a torque sensor, a pressure sensor, and a temperature sensor;
  the condition indicators and the sensor signals defining operating characteristics of the powertrain;

comparing, at the controller on-board the machine, the operating characteristics of the powertrain to the event threshold;

generating, at the controller on-board the machine, an event response if the operating characteristics exceed the event threshold for a time period exceeding the time threshold; and further comprising generating speed signals indicative of a speed of one of the plurality of rotating components, generating torque signals indicative of a torque generated by a prime mover operatively associated with the powertrain, and wherein the operating characteristics are defined by the condition indicators, the speed signals, and the torque signals.

15. The method of claim 14, further comprising determining the event threshold based upon the speed signals and the torque signals.

16. The method of claim 14, wherein the event threshold defines a critical threshold, the time threshold defines a critical time threshold, and further comprising:

accessing a warning threshold;

accessing a warning time threshold; and if the operating characteristics do not exceed the critical threshold for a time exceeding the critical time threshold, comparing the operating characteristics to the warning threshold, and if the operating characteristics exceed the warning threshold for a time exceeding the warning time threshold, generating the event response.

17. The method of claim 16, further comprising:

accessing a counter threshold, if the operating characteristics exceed the warning threshold for a time exceeding the warning time threshold, adding to a counter;

comparing the counter to the counter threshold; and only generating the event response if the counter exceeds the counter threshold.

* * * * *